(12) United States Patent
Turner

(10) Patent No.: US 6,498,474 B1
(45) Date of Patent: Dec. 24, 2002

(54) ROTATIONAL VELOCITY AND DIRECTION SENSING SYSTEM

(75) Inventor: Jason D. Turner, Dearborn Heights, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/893,288

(22) Filed: Jun. 27, 2001

(51) Int. Cl.[7] .................. G01P 13/00; G01P 3/52; G01B 7/30
(52) U.S. Cl. .................. 324/165; 324/202; 324/207.25
(58) Field of Search .................. 324/207.2, 207.25, 324/207.23, 160, 161, 163, 165, 167, 202; 340/672

(56) References Cited

U.S. PATENT DOCUMENTS

| | | | | |
|---|---|---|---|---|
| 4,013,946 A | * | 3/1977 | Lewis | 324/247 |
| 4,746,862 A | * | 5/1988 | Ueki | 324/208 |
| 5,850,141 A | * | 12/1998 | Adler | 324/173 |
| 5,880,367 A | | 3/1999 | Vaughn | 73/488 |
| 6,016,056 A | * | 1/2000 | Seki | 324/165 |
| 6,242,904 B1 | * | 6/2001 | Shirai et al. | 324/165 |

* cited by examiner

Primary Examiner—Edward Lefkowitz
Assistant Examiner—Reena Aurora
(74) Attorney, Agent, or Firm—MacMillan, Sobanski & Todd, LLC

(57) ABSTRACT

A rotational sensor system for detecting rotational velocity and rotational direction of a rotating member, such as a vehicle axle, including a tone ring mounted to the rotating member. The system includes a pair of active sensors mounted adjacent to the tone ring and spaced from one another, which, when activated, produce an electric signal in response to movements in the tone wheel. A processor receives the electric signals from the sensors and generates a signal indicative of rotational velocity and rotational direction of the rotating member. Also, preferably, an output signal is created that uses square waves with different amplitude levels for the signal highs and lows depending upon the direction of rotation.

11 Claims, 2 Drawing Sheets

ROTATIONAL VELOCITY AND DIRECTION SENSING SYSTEM

BACKGROUND OF THE INVENTION

The present invention relates generally to speed sensing devices for rotating equipment and, in particular, to a speed sensing device that also detects rotational direction of the rotating equipment.

Vehicle wheel speed sensor systems are well known. Rotational speed is used for numerous measurement devices and control systems, including vehicle speedometer readings, vehicle cruise control feedback, and vehicle antilock braking system feedback. Wheel speed sensors can be mounted in any of several locations, such as in wheel bearing assemblies, and in the differential.

Speed sensor systems typically operate by means of a target mounted to rotated with the rotating equipment. This target is paired with, and is separated from, a stationary sensor by an air gap. The stationary sensor generates a signal when the target rotates past it. There are indices around the periphery of the target. The number of times the indices pass by the sensor, or the frequency of signals generated, in a given period of time, is then converted to a rotating speed and passed on to the appropriate measurement device or control system.

Vehicle wheel speed sensing systems are typically grouped into two types, active sensor systems and passive sensor systems. Passive sensors do not require a power supply in order to operate. In a passive sensor system, the stationary sensor is a permanent magnet that projects a magnetic field into the air gap. The stationary sensor detects a change in the magnetic field's reluctance caused by the moving target, typically a toothed wheel made of ferrous material, as it passes through the magnetic field. The output of the passive sensor is a raw analog signal that varies greatly with the rotational speed of the vehicle wheel. The output of the passive sensor is also susceptible to false signals when the wheel is subjected to vibration. In addition, passive sensors are limited to a close clearance air gap of about 1 to 2 mm.

Active sensor systems represent the next generation technology to be utilized in vehicle wheel speed sensing devices. Active sensor systems typically utilize one of two technology devices, which are well known in the art as Hall Effect devices or Magneto-Resistive devices. The two technologies have been found to be comparable in terms of performance. Active sensor systems require a power supply to operate and are further divided into two categories, back-biased sensors and non back-biased sensors. Back-biased sensors generate the magnetic field from the stationary sensor, while the moving target, or encoder, is constructed of ferrous material, as in the passive sensor system. Non-back biased sensors, conversely, generate the magnetic field from the encoder. Because the magnetic field is generated from the moving target, non back-biased stationary sensors do not need magnets, require correspondingly fewer components and are thus smaller than back-biased stationary sensors. Sensors installed in either back-biased or non back-biased form detect the frequency of the changes in voltage of the magnetic field, and direct the output to the appropriate measurement device or control system. The output of the active sensor, in either back-biased or non back-biased form, is a high quality digital signal that varies between fixed values and is not affected by the rotational speed of the wheel. Active sensor control systems are smaller than passive sensor control systems, can function at zero and near zero rotational speed, are immune to false signals due to vibration, and are capable of having a greater air gap than passive stationary sensors.

A drawback to the above mentioned systems is that while they can measure rotational velocity, they do not measure the direction of rotation. But, for rotational detection relating to vehicle wheels, direction detection is becoming important in addition to the common measurement of wheel rotational velocity. This need is arising due to improvements in existing as well as new features being proposed for vehicles, including anti-lock braking, traction control, vehicle stability control, electric park brake, electro-hydraulic braking, adaptive cruise control, integrated chassis control, and in-vehicle navigation. Furthermore, due to market pressures to reduce the cost of vehicles, such a system capable of detecting both rotational velocity and direction need to perform the functions required, in harsh environmental conditions, accurately and reliably, and yet for minimal additional cost.

SUMMARY OF THE INVENTION

In its embodiments, the present invention contemplates a rotational sensor system for detecting rotational velocity and rotational direction of a rotatable member rotatable in a forward and in a reverse rotational direction about an axis of rotation. The rotational sensor system includes a rotatable element adapted to operatively engage and rotate with the rotatable member about the axis of rotation, with the rotatable element having a generally circular periphery that includes means, spaced about the periphery, for creating magnetic field variations, first sensor means, adjacent to the periphery, for sensing variations in a magnetic field and producing an electric signal in response thereto, and second sensor means, adjacent to the periphery and circumferentially spaced about the periphery from said first sensor means, for sensing variations in a magnetic field and producing an electric signal in response thereto. The system also includes means for generating a magnetic field, means for receiving the electric signals from the first sensor means and second sensor means and detecting a phase shift between the signals from the first sensor means and the second sensor means, and means for generating an output signal indicative of rotational velocity and rotational direction of the rotatable element.

The present invention further contemplates a rotational sensor system for detecting rotational velocity and rotational direction of a rotatable member rotatable in a forward and in a reverse rotational direction about an axis of rotation. The rotational sensor system includes a rotatable element adapted to operatively engage and rotate with the rotatable member about the axis of rotation, with the rotatable element having a generally circular periphery that includes means, spaced about the periphery, for creating magnetic field variations, first sensor means, adjacent to the periphery, for sensing variations in a magnetic field and producing an electric signal in response thereto, and second sensor means, adjacent to the periphery and circumferentially spaced about the periphery from said first sensor means, for sensing variations in a magnetic field and producing an electric signal in response thereto. The system also includes means for generating a magnetic field, means for receiving the electric signals from the first sensor means and second sensor means and detecting a phase shift between the signals from the first sensor means and the second sensor means, and means for generating an output signal indicative of rotational velocity and rotational direction of the rotatable element. The system further includes means for generating an output signal including a series of square waves having frequencies corresponding to the rotational velocity of the rotatable element and having amplitudes that are in a first range when the rotatable element is rotating in the forward direction and in a second range when the rotatable element is rotating in the reverse direction.

Accordingly, an object of the present invention is to provide a relatively simple rotation sensing system that can detect rotational velocity, including near zero and zero rotational velocity, as well as rotational direction.

Another object of the present invention is to provide a rotational velocity and direction sensing system with a simple and reliable signal for its output protocol.

An advantage of the present invention is that more information about a rotating member is reliably provided by the sensing system while minimizing the complexity of the system.

Another advantage of the present invention is that it is relatively simple, meets functional requirements for measuring rotational velocity, even down to zero velocity, as well as rotational direction, while operating fast and reliably in harsh vehicle environments.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
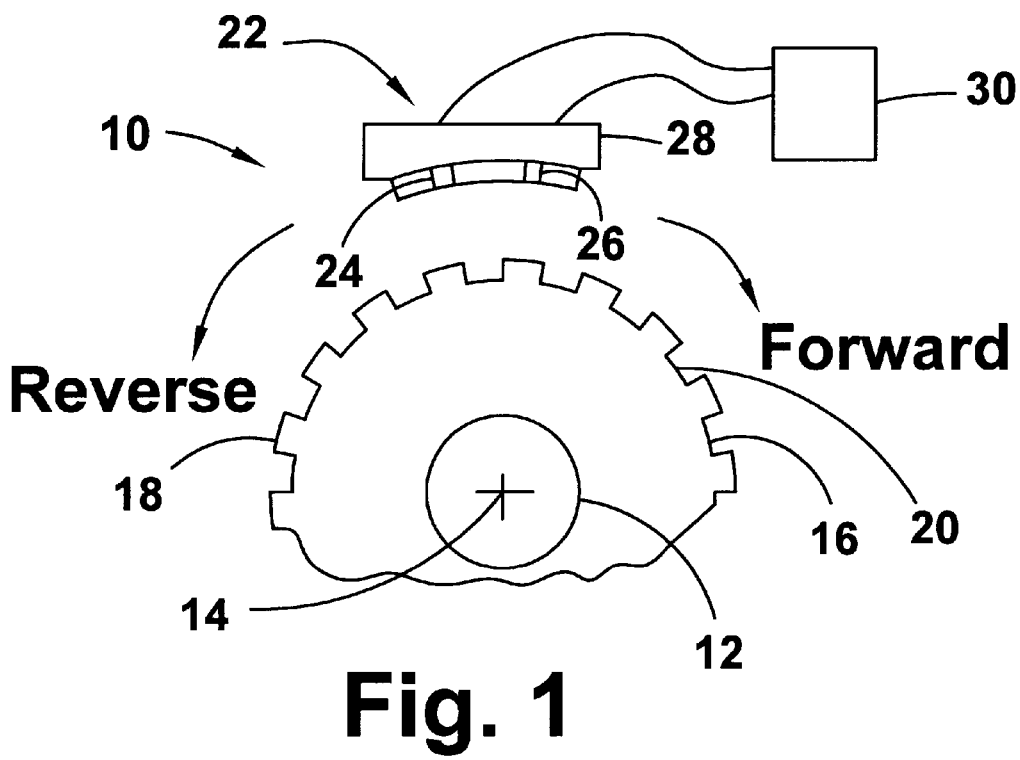
FIG. 1 is a schematic diagram of a wheel rotational sensing system in accordance with the present invention.

Referring to FIG. 1, a vehicle wheel speed sensor system is shown generally at 10, which detects the rotational velocity of a rotating member 12, as it rotates about its axis 14. The axis of rotation 14 has a forward and a reverse direction of rotation, as illustrated in FIG. 1. Mounted to the member 12, and oriented to rotate about the axis 14 with the member 12, is a tone ring 16. The tone ring 16 is generally circular, made of a ferrous material, and includes a series of teeth 18 protruding from and spaced about its periphery 20.

The sensor system 10 also includes a sensor assembly 22, which includes a first 24 and a second 26 Hall effect sensor. Both sensors are mounted adjacent to but spaced from the periphery 20 and teeth 18. The radial distance between the tone ring 16 and the sensors 24, 26 is called the air gap. The sensors 24, 26 are oriented to project inwardly toward the axis of rotation 14, with the second sensor 26 spaced circumferentially about the periphery 20 from the first sensor 24. Mounted adjacent to the sensors 24, 26 and on the opposite side from the tone ring 16 is a biasing magnet 28. This sensor assembly 22 is thus a back biased configuration. The sensors 24, 26 are electrically connected to an electronic control unit 30, which receives the output from the sensors 24, 26. Both sensors 24, 26 are further electrically connected to a power supply (not shown) that supplies power to operate the sensors 24, 26.

Figure 2:
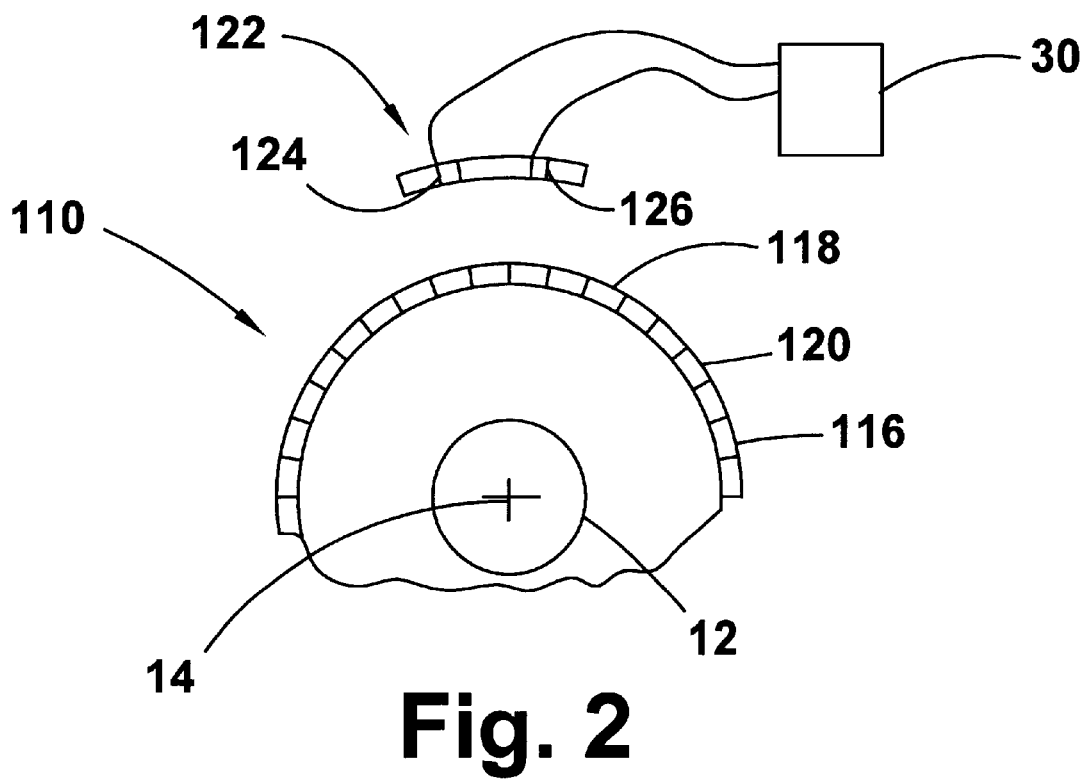
FIG. 2 is a schematic diagram of a second embodiment of the wheel rotational sensing system in accordance with the present invention.

Referring to FIG. 2, an alternate embodiment of the wheel speed sensor system 110 is shown. In this embodiment, a magnetically encoded target wheel 116, rather than a tone ring, is mounted to the rotating member 12 about the axis 14. About the periphery 120 or the target wheel 116 is a series of alternately magnetically encoded teeth 118. The two Hall sensors 124, 126, of the sensor assembly 122, are mounted adjacent to and spaced firm the teeth 118 of the target wheel 116. In this way, no magnet is needed to mount behind the two sensors 124, 126. Thus, the sensor assembly 122 is a non-back biased configuration. The output signals, however, produced by the sensors 124, 126 are essentially the same as with the back biased configuration shown in FIG. 1. Again, the sensors 124, 126 are electrically connected to the electronic control unit 30.

Figure 3:
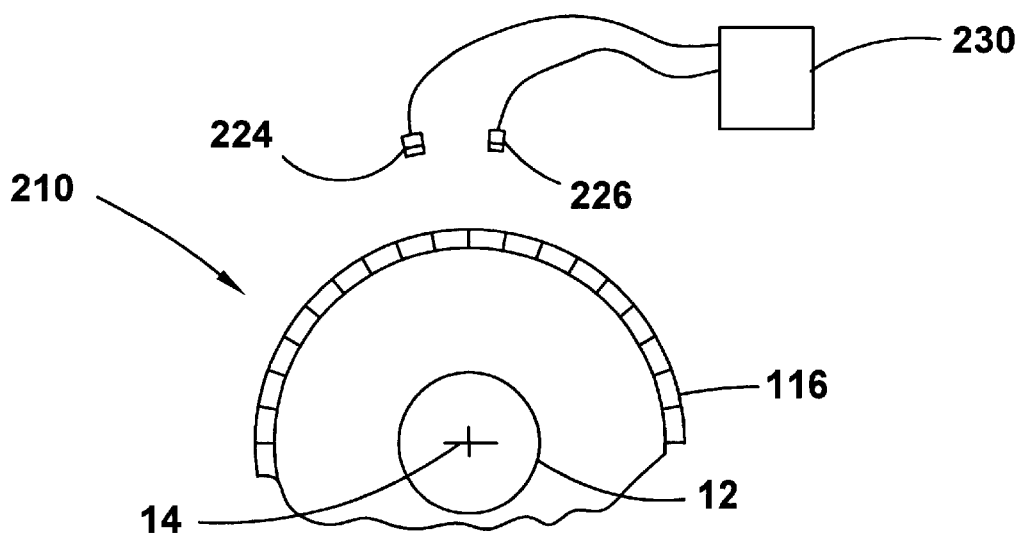
FIG. 3 is a third embodiment of the wheel rotational sensing system in accordance with the present invention.

Referring to FIG. 3, a third embodiment of the present invention is shown. In this embodiment, wheel speed sensor system 210 includes a target wheel 116, as is shown in the second embodiment, that is mounted to the rotating member 12 about the axis of rotation 14. Two separate Hall effect sensors 224, 226 are mounted a predetermined distance from the target wheel 116 and from each other. The sensors 224, 226 are each connected to an electronic control unit 230, which processes the output signal from each of the sensors 224, 226.

Figure 4:
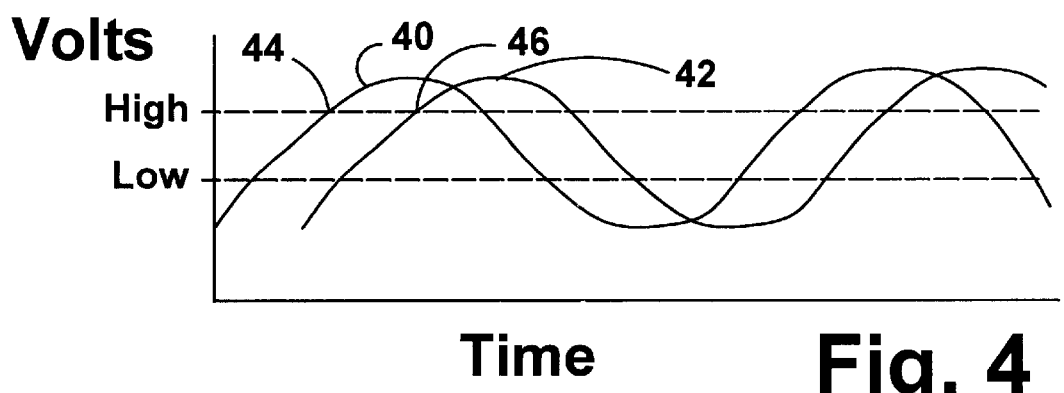
FIG. 4 is a graph illustrating the analog output from two poles of a sensor, with voltage on one axis and time on the other, in accordance with the present invention.
Figure 5:
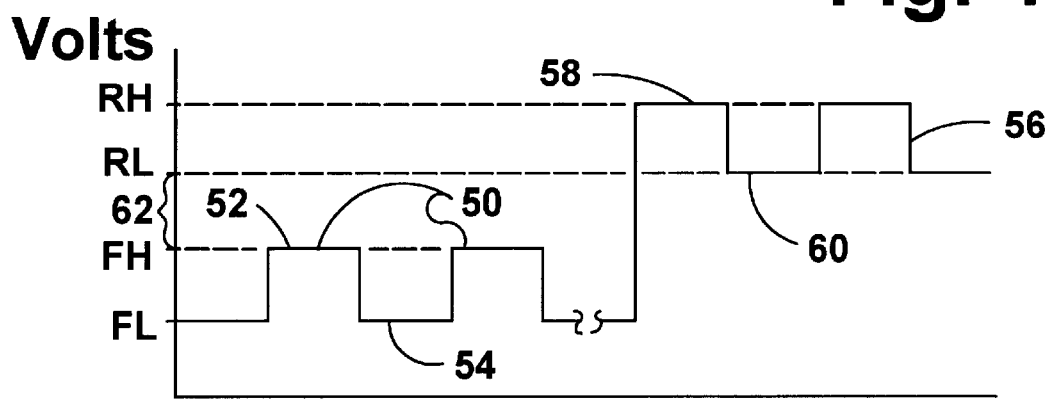
FIG. 5 is a graph illustrating an output signal for the sensor system with time on one axis and voltage on the other, in accordance with the present invention.

Referring to FIGS. 4 and 5, as they relate to FIG. 1, the operation of the wheel speed sensor system 10 will be described. Although the operation of this system is being described in reference to the first embodiment, it is equally applicable to either of the other two embodiments. Power is supplied to the sensors when it is desired to measure the rotational velocity and direction of the rotating member 12. As the member 12 rotates, thus causing the teeth to pass by the Hall effect sensors 24, 26, the sensors detect the frequency of the changes in voltage of the magnetic field, and produce raw analog signals. An example of how these signals might look with the member 12 rotating in the forward direction is shown in FIG. 4. A first analog signal 40 is output from the first sensor 24, and a second analog signal 42 is output from the second sensor 26, with this second signal 42 being phase shifted from the first. This phase shift allows the direction of rotation to be determined. For example, in FIG. 4, the analog signal shows the first signal high threshold 44 occurring just prior to the second signal high threshold 46, and of course the same with the low thresholds. If the second signal high threshold occurs just prior to the first signal high threshold, then this would indicate a reverse rotational direction. Once these raw analog signals 40, 42 are received by the control unit 30, they can then be processed to produce a rotational velocity and direction signal protocol that is easy to read, accurate and reliable.

Referring to FIG. 5, an example of the protocol of the output signal will be discussed. The first two square waves 50 shown fluctuate between a forward high amplitude 52 and a forward low amplitude 54, indicative of forward rotation. The rotational velocity is based upon measuring the time between consecutive rising edges, or falling edges, of the square waves 50. The second two square waves 56 show an example of the signal for a reverse rotational direction.

The reverse high amplitude 58 and reverse low amplitude 60 values are both higher than the forward amplitudes 52, 54, but preferably have the same difference in amplitude between the high and low values of the respective waves. Further, the reverse low amplitude 60 is sufficiently higher than the forward high amplitude so that there is a dead band 62 between the amplitudes of the waves for the forward direction and that for the reverse direction. The direction of rotation is then based upon determining the amplitude for either the high 52, 58 or the low 54, 60 amplitudes of the square waves 50, 56.

Error protection is provided by including the dead band 62 between the signal levels for the forward rotation and the signal levels for the reverse rotational direction. With these signals, then, both the rotational velocity and the direction of rotation can be easily and reliably determined. This protocol produces a simple and unique signal for determining rotational direction in addition to the rotational velocity. Rather than encode a direction indicator at the beginning of a signal, this protocol changes the amplitude of levels for the square waves that are used to measure the rotational velocity.

In accordance with the provisions of the patent statutes, the present invention has been described in what is considered to represent its preferred embodiment. However, it should be noted that the invention can be practiced otherwise than as specifically illustrated and described without departing from its spirit or scope. For example, the present invention could be utilized in numerous types of rotating equipment and, therefore, is not limited solely to applications in motor vehicles.

I claim:

1. A rotational sensor system for detecting rotational velocity and rotational direction of a rotatable member rotatable in a forward and in a reverse rotational direction about an axis of rotation, the rotational sensor system comprising:
    a rotatable element adapted to operatively engage and rotate with the rotatable member about the axis of rotation, with the rotatable element having a generally circular periphery that includes means, spaced about the periphery, for creating magnetic field variations;
    first sensor means, adjacent to the periphery, for sensing variations in a magnetic field and producing an electric signal in response thereto;
    second sensor means, adjacent to the periphery and circumferentially spaced about the periphery from said first sensor means, for sensing variations in a magnetic field and producing an electric signal in response thereto;
    means for generating a magnetic field;
    means for receiving the electric signals from the first sensor means and second sensor means and detecting a phase shift between the signals from the first sensor means and the second sensor means; and
    means for generating an output signal including a series of square waves having frequencies corresponding to the rotational velocity of the rotatable element and having amplitudes that are in a first range when the rotatable element is rotating in the forward direction and in a second range when the rotatable element is rotating in the reverse direction, and including a dead amplitude zone between the first range and the second range of amplitudes for the square waves.

2. The system according to claim 1 wherein the first sensor means and second sensor means are Hall Effect sensors, the means for generating a magnetic field is a magnet mounted adjacent the Hall effect sensor and opposite the rotatable element, and the rotatable element is a ferrous target wheel with teeth extending from the periphery.

3. The system according to claim 1 wherein the first sensor means and the second sensor means are Hall effect sensor and the rotatable element is a tone ring with alternating polarity magnets affixed around the periphery.

4. The system according to claim 1 wherein the first sensor means and second sensor means are Hall Effect sensors, the means for generating a magnetic field is a magnet mounted adjacent the Hall effect sensors and opposite the rotatable element, and the rotatable element is a ferrous target wheel with teeth extending from the periphery.

5. The system according to claim 1 wherein the first sensor means and the second sensor means are Hall effect sensors and the rotatable element is a tone ring with alternating polarity magnets affixed around the periphery.

6. The system according to claim 1 wherein the first and second sensor means are Hall effect sensors, with both mounted in the same sensor assembly.

7. The system according to claim 1 wherein the first and second sensor means are Hall effect sensors, with each mounted in a separate sensor assembly.

8. A rotational sensor system for detecting rotational velocity and rotational direction of a rotating member rotatable in a forward and in a reverse rotational direction about an axis of rotation, the rotational sensor system comprising:
    a rotatable element adapted to operatively engage and rotate with the rotating member about the axis of rotation, with the rotatable element having a generally circular periphery that includes means, spaced about the periphery, for creating magnetic field variations;
    first sensor means, adjacent to the periphery, for sensing variations in a magnetic field and producing an electric signal in response thereto;
    second sensor means, adjacent to the periphery and circumferentially spaced about the periphery from said first sensor means, for sensing variations in a magnetic field and producing an electric signal in response thereto;
    means for generating a magnetic field;
    means for receiving the electric signals from the first sensor means and second sensor means and detecting a phase shift between the signals from the first sensor means and the second sensor means; and
    means for generating an output signal including a series of square waves having frequencies corresponding to the rotational velocity of the rotatable element and having amplitudes that are in a first range when the rotatable element is rotating in the forward direction and in a second range when the rotatable element is rotating in the reverse direction.

9. The system according to claim 8 wherein the signal includes a dead amplitude zone between the first range and the second range of amplitudes for the square waves.

10. The system according to claim 9 wherein the first sensor means and second sensor means are Hall Effect sensors, the means for generating a magnetic field is a magnet mounted adjacent the Hall effect sensor and opposite the rotatable element, and the rotatable element is a ferrous target wheel with teeth extending from the periphery.

11. The system according to claim 9 wherein the first sensor means and the second sensor means are Hall effect sensors and the rotatable element is a tone ring with alternating polarity magnets affixed around the periphery.

* * * * *